United States Patent
Nakajima et al.

(10) Patent No.: US 10,215,503 B2
(45) Date of Patent: Feb. 26, 2019

(54) HEAT EXCHANGER, AIR-CONDITIONING APPARATUS USING THE SAME AND METHOD OF MANUFACTURING THE SAME

(71) Applicant: Mitsubishi Electric Corporation, Tokyo (JP)

(72) Inventors: Takashi Nakajima, Tokyo (JP); Takashi Kato, Tokyo (JP); Wataru Suzuki, Tokyo (JP); Ryoichi Ikeda, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 357 days.

(21) Appl. No.: 14/897,058

(22) PCT Filed: Sep. 16, 2014

(86) PCT No.: PCT/JP2014/074450
§ 371 (c)(1),
(2) Date: Dec. 9, 2015

(87) PCT Pub. No.: WO2015/041216
PCT Pub. Date: Mar. 26, 2015

(65) Prior Publication Data
US 2016/0153724 A1    Jun. 2, 2016

(30) Foreign Application Priority Data

Sep. 20, 2013    (WO) .................. PCT/JP2013/075522

(51) Int. Cl.
*F28F 1/22*    (2006.01)
*F28F 1/12*    (2006.01)
(Continued)

(52) U.S. Cl.
CPC .............. *F28F 1/12* (2013.01); *B21D 53/085* (2013.01); *B23P 15/26* (2013.01); *F25B 39/00* (2013.01);
(Continued)

(58) Field of Classification Search
CPC .......... F28D 1/05366; F28D 2001/0273; F28F 2215/12
(Continued)

(56) References Cited

U.S. PATENT DOCUMENTS 1,997,058 A     4/1935   Hart
5,573,059 A *  11/1996   Hamamoto et al. .. F24F 1/0007
                                                    165/122
(Continued)

FOREIGN PATENT DOCUMENTS

EP    0 633 435 A1    1/1995
JP    3014703 U       6/1995
(Continued)

OTHER PUBLICATIONS

JP 2013-19596 including machine translation.*
(Continued)

*Primary Examiner* — Allen Flanigan
(74) *Attorney, Agent, or Firm* — Posz Law Group, PLC

(57) ABSTRACT

A heat exchanger includes plural heat transfer tubes and plural fins each having two opposing sides and plural opening ports on one side, of the two sides, for inserting and fastening the heat transfer tubes, and the heat exchanger is formed such that the plural heat transfer tubes and the plural fins cross each other, wherein at least two of the plural heat transfer tubes are fastened to the opening ports in a state of protruding from the one sides of the plural fins toward the outside of the plural fins.

3 Claims, 5 Drawing Sheets

(51) Int. Cl.
*F25B 39/00* (2006.01)
*F28F 1/32* (2006.01)
*B23P 15/26* (2006.01)
*B21D 53/08* (2006.01)
*F28D 1/053* (2006.01)

(52) U.S. Cl.
CPC ............ *F28F 1/32* (2013.01); *F28D 1/05366* (2013.01); *F28F 2215/12* (2013.01)

(58) Field of Classification Search
USPC ........................................................ 165/152
See application file for complete search history.

(56) References Cited

U.S. PATENT DOCUMENTS

| | | |
|---|---|---|
| 2004/0149424 A1 | 8/2004 | Memory et al. |
| 2008/0271879 A1 | 11/2008 | Schneider |
| 2009/0145587 A1 | 6/2009 | Young et al. |
| 2012/0103583 A1 | 5/2012 | Kim et al. |

FOREIGN PATENT DOCUMENTS

| | | |
|---|---|---|
| JP | 2002-139282 A | 5/2002 |
| JP | 2004-353954 A | 12/2004 |
| JP | 2010-156525 A | 7/2010 |
| JP | 2011-117628 A | 6/2011 |
| JP | 2012-030284 A | 2/2012 |
| JP | 2012-154497 A | 8/2012 |
| JP | 2012-183554 A | 9/2012 |
| JP | 2012-184907 A | 9/2012 |
| JP | 2012-184920 A | 9/2012 |
| JP | 2013-7540 A | 1/2013 |
| JP | 2013-019596 A | 1/2013 |
| WO | 2012/098912 A1 | 7/2012 |

OTHER PUBLICATIONS

JP 2013-007540 including machine translation.*
Japanese Office Action dated Oct. 18, 2016 in the corresponding JP application No. 2015-537926. (English translation attached).
Extended European Search Report dated May 8, 2017 issued in corresponding EP patent application No. 14846663.4.
Office Action dated Feb. 4, 2017 in the corresponding CN patent application No. 201480042143.7 (English translation attached).
International Search Report of the International Searching Authority dated Dec. 9, 2014 for the corresponding international application No. PCT/JP2014/074450 (and English translation).

* cited by examiner

HEAT EXCHANGER, AIR-CONDITIONING APPARATUS USING THE SAME AND METHOD OF MANUFACTURING THE SAME

CROSS REFERENCE TO RELATED APPLICATION

This application is a U.S. national stage application of International Application No. PCT/JP2014/074450 filed on Sep. 16, 2014, which claims priority to International Application No. PCT/JP2013/075522 filed on Sep. 20, 2013, the disclosures of which are incorporated herein by reference.

TECHNICAL FIELD

The present invention relates to a heat exchanger of a finned tube type employing flat tubes, an air-conditioning apparatus using the same and a method of manufacturing the same.

BACKGROUND ART

Conventionally, in a heat exchanger for car air-conditioning system, since weight reduction is very important, a heat exchanger using aluminum flat multiport pipes as heat transfer tubes is employed. Many of them employ a system called corrugate and are configured by setting fins made of aluminum thin plate material successively undulating between the flat tubes. Moreover, partially, there also exists a structure called finned tube type, in which fins are inserted across plural flat tubes.

On the other hand, in a heat exchanger used for air-conditioning machine for home use or building use, a finned tube structure employing copper cylindrical pipes as the heat transfer tubes, in which many fins are provided to cross plural heat transfer tubes, was mainstream; however, in recent years, similar to the car air-conditioning machine, the heat exchangers of the finned tube type using the aluminum flat tubes as the heat transfer tubes are employed in some cases (for example, refer to Patent Literature 1).

CITATION LIST

Patent Literature

Patent Literature 1: Japanese Unexamined Patent Application Publication No. 2012-154497

SUMMARY OF INVENTION

Technical Problem

However, in a heat exchanger using conventional aluminum flat tubes having a structure including opening ports for inserting the flat tubes into the fins, there was a problem that, when a force was applied to the fin from a direction to insert the flat tubes, a portion of the fin protruding from an end portion of the flat tube was likely to be deformed as compared to other portions, and the fin was bent or crushed in manufacturing or assembling.

The present invention has been made to solve the problem as described above, and has as an object to acquire a heat exchanger of the finned tube type, in which a fin is not deformed even if a force is applied from a side of the fin where opening ports for inserting flat tubes exist, an air-conditioning apparatus using the same and a method of manufacturing the same.

Solution to Problem

A heat exchanger of the present invention includes plural heat transfer tubes and plural fins each having two opposing sides and plural opening ports on one side, of the two sides, for inserting and fastening the plural heat transfer tubes, and the heat exchanger is formed such that the plural heat transfer tubes and the plural fins cross each other, wherein at least two of the plural heat transfer tubes are fastened to the opening ports in a state protruding from the one sides of the plural fins toward the outside of the plural fins.

Advantageous Effects of Invention

With the heat exchanger of the present invention, even though a force is applied from a side where the opening ports of the fin are provided, end portions of the flat tubes protruding from the opening ports of the fin receives the force, and thereby, it is possible to suppress deformation of the fin.

DESCRIPTION OF EMBODIMENTS

Hereinafter, embodiments of the present invention will be described based on the drawings. Note that the present invention is not limited by the embodiments described as follows.

Embodiment 1

Figure 1:
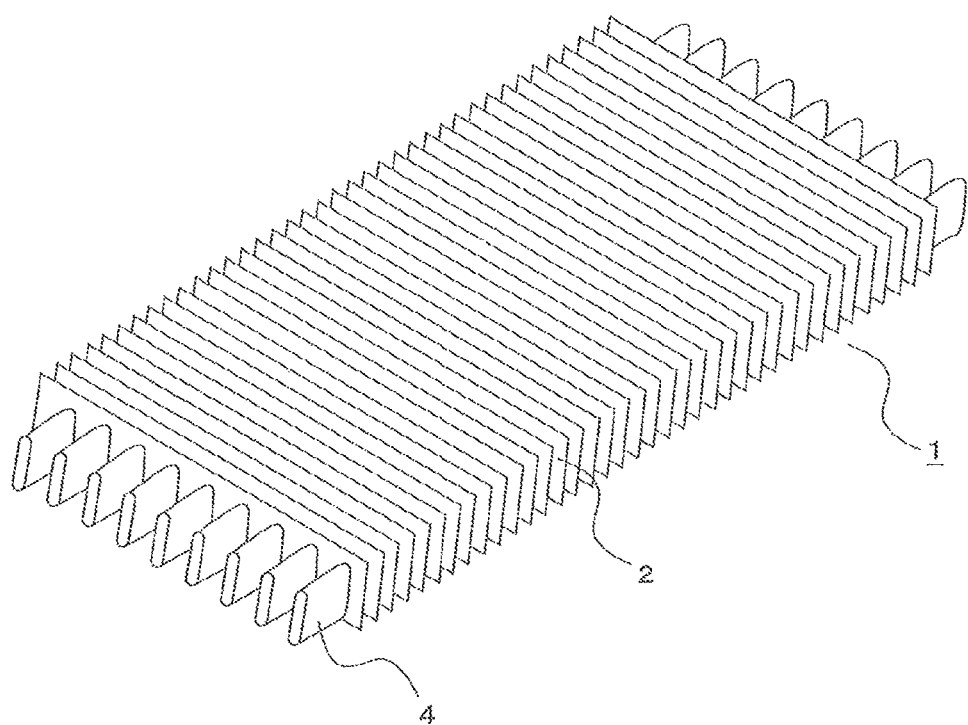
FIG. 1 is a perspective view showing a heat exchanger in Embodiment 1.

FIG. 1 is a perspective view showing a heat exchanger in Embodiment 1 of the present invention.

Figure 2:
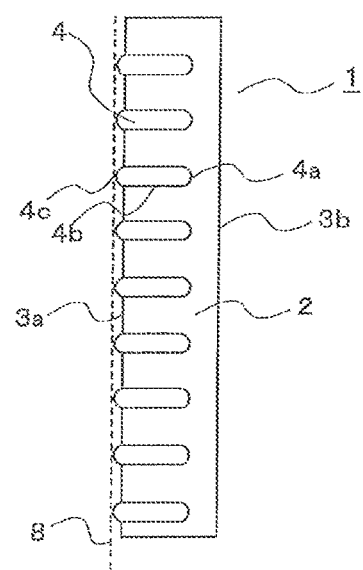
FIG. 2 is a cross-sectional view showing the heat exchanger in Embodiment 1.

FIG. 2 is a cross-sectional view showing the heat exchanger in Embodiment 1 of the present invention.

Figure 3:
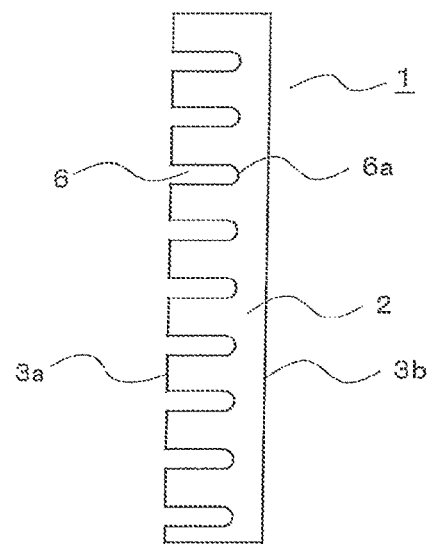
FIG. 3 is a plan view showing a fin of the heat exchanger in Embodiment 1.

FIG. 3 is a plan view showing a fin of the heat exchanger in Embodiment 1 of the present invention.

The heat exchanger 1 of Embodiment 1 is a heat exchanger of a finned tube type, in which, as shown in FIG. 1, plural flat tubes 4 are arranged in parallel and plural fins 2 are attached in a direction orthogonal to pipe axes of the flat tubes 4. A fluid, such as refrigerant, flows inside the flat tubes 4, and by forming the cross section of the flat tube into a flat shape, it is possible to increase an amount of the fluid, such as the refrigerant, without increasing ventilating resistance, and accordingly, sufficient performance as a heat exchanger is available even in a case of being downsized.

The flat tube 4 is, for example, a multipart flat tube including plural refrigerant flow channels inside thereof. A cross section of the flat tube 4 is formed by arc-shaped portions 4a and 4c at both end portions and a pair of long side portions 4b connecting the arc-shaped portions 4a and 4c. In other words, a flat shape including a major axis in the direction of long side portions 4b and a minor axis formed by the arc-shaped portions 4a and 4c is provided. A material of the flat tube 4 is desirable to be made of metal that is excellent in heat transfer and less likely to be corroded, for example, it may be considered to be made of aluminum or copper.

The fin 2 is, as shown in FIG. 3, substantially rectangular in a planar shape thereof, and on one side 3a, plural opening ports 6, into which the flat tubes 4 are inserted to be attached, are arranged in a row like the teeth of a comb.

The opening port 6 has a shape of a long and narrow cutout having a major axis from one side 3a toward the other side 3b of the fin 2. As a fin material for forming the fin 2, in general, an aluminum thin plate having a thickness of the order of from 0.1 mm to 0.7 mm wound around a reel like a hoop, or a fin material formed into a sheet shape is used. The fin 2 is formed one by one by sequentially separating many fins 2, which have been formed into a predetermined shape by use of a progressive press device, from the hoop-like or sheet-like fin material. Note that the fins 2 may be formed one by one by a device other than the progressive press device.

The dimension of the width of the opening port 6 is substantially the same as the length of the minor axis side in the cross section of the flat tube 4, which is the length such that, when the flat tube 4 is inserted into the opening port 6, fitted without any space therebetween.

Moreover, in a deepest portion 6a in a depth direction of the opening port 6, an arc portion having substantially the same shape as the arc-shaped portion 4a at the end portion of the flat tube 4 is formed, and the arc portion and the arc-shaped portion 4a are configured to contact each other when the flat tube 4 is inserted into the deepest portion 6a of the opening port 6. Then, the dimensions of the plural opening ports 6 in the depth direction (the lengths from the one side 3a to the deepest portion 6a of the fin 2) are the same lengths as one another.

Here, in the heat exchanger of Embodiment 1, as shown in FIG. 2, in a state where the arc-shaped portion 4a at one end portion of the flat tube 4 contacts the deepest portion 6a in the opening port 6 of the fin 2, the arc-shaped portion 4c at the other end portion of the flat tube 4 is in a state protruding from the one side 3a in the opening port 6 of the fin 2. In other words, the depth dimension of the opening port 6 is set shorter than the length of the major axis side in the cross section of the flat tube 4.

Then, a flat tube end portion tangential line 8 connecting the tip ends of the arc-shaped portions 4c of the plural flat tubes 4 is linear and parallel to the one side 3a of the fin 2.

Note that, in the above, description has been given of positional relationship with the flat tubes 4 by extracting only one fin 2; however, as shown in FIG. 1, since the plural fins 2 are attached to the flat tubes 4, the positional relationship between all the fins 2 and flat tubes 4 is the same as the shape in FIG. 2. Moreover, an example in which all of the flat tubes 4 are in a state protruding from the one side 3a in the opening ports 6 of the fin 2 has been shown; however, there may be a state in which part of the flat tubes (for example, two or more) are protruding from the one side 3a of the fin 2.

Next, a method of manufacturing a heat exchanger of Embodiment 1 will be described.

Figure 4A:
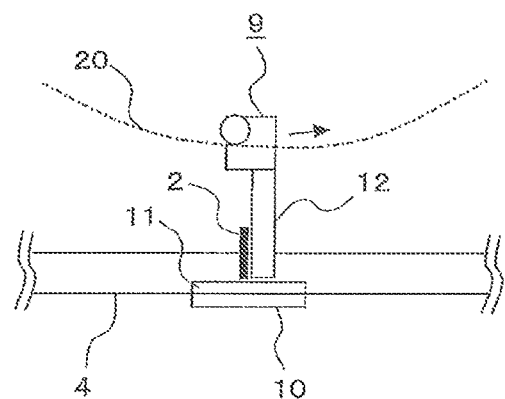
FIG. 4a is a diagram showing a method of manufacturing a heat exchanger in Embodiment 1.

FIG. 4a is a diagram showing the method of manufacturing a heat exchanger in Embodiment 1.

Figure 4B:
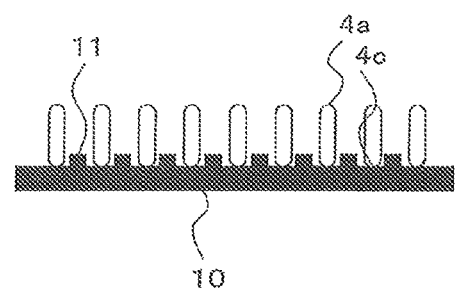
FIG. 4b is a diagram showing flat tubes aligned on a flat tube positioning member in the method of manufacturing a heat exchanger in Embodiment 1.

Moreover, FIG. 4b is a diagram showing flat tubes aligned on a flat tube positioning member 10 in the method of manufacturing a heat exchanger in Embodiment 1.

As shown in FIG. 4a, as a manufacturing method of assembling the fins 2 and the flat tubes 4, the plural flat tubes 4 are fastened onto a flat tube positioning member 10 in advance, and moved in the axial direction at a constant speed. Moreover, a method in which the fins 2 are held by fin holding units 12 of a fin insertion device 9 one by one and moved to be inserted and fastened into the flat tubes 4 arranged on the flat tube positioning member 10 is generally adopted (for example, refer to Japanese Unexamined Patent Application Publication No. 2012-30284).

Each of the plural fin holding units 12 is arranged on the circumference of a drum 20, and circulates with rotation of the drum 20. Then, each of the fin holding units 12 receives and holds a single fin 2, and applies the fin 2 being held to an outer circumferential surface of the flat tube 4.

Holding of the fin 2 by the fin holding unit 12 is carried out by, for example, the so-called vacuum absorption for absorbing the fin 2 by use of air suction. The fin insertion device 9 is coupled to a cam follower (not shown).

In consideration of heat transfer, fastening between the flat tube 4 and the fin 2 can be carried out by brazing, soldering, welding, adhesive or the like.

As the method of manufacturing a heat exchanger of Embodiment 1, as shown in FIG. 4b, the flat tube positioning member 10, on which fin contact members 11 protrude, is applied to the fin insertion device 9, to thereby assemble the fins 2 and the flat tubes 4.

In a case where such a fin insertion device 9 is used, the one side 3a of the fin 2 where the opening ports 6 exist contacts the fin contact members 11 in insertion operation, and thereby fastening is carried out in a state where the arc-shaped portions 4c at the end portions of the flat tubes 4 protrude from the opening port 6.

In other words, by arranging the upper end portion of the fin contact member 11 above the lower ends of the flat tubes 4 that contact the flat tube positioning member 10 (the tip ends of the arc-shaped portions 4c), the end portions of the flat tubes 4 come to be positioned outside the one side 3a of the fin 2 where the opening ports 6 exist. With this state, the fins 2 and the flat tubes 4 are brazed.

Then, the heat exchanger of Embodiment 1 is able to prevent deformation of the fin 2 even though a force is applied from the one side 3a of the fin 2 where the opening ports 6 are provided, because the end portions of the flat tubes 4 protruding from the opening ports 6 of the fin 2 receive the force. Moreover, by configuring the air-conditioning apparatus by use of the heat exchanger 1 that is less likely to be deformed, there occurs no increase in air resistance or no degradation in heat exchanging efficiency of the heat exchanger part caused by the deformed fin 2, and thereby an air-conditioning apparatus with excellent cooling and heating performance becomes available.

Embodiment 2

In Embodiment 1, the flat tubes 4 are made to be uniformly protruded from the opening ports 6 of the fin 2, and the flat tube end portion tangential line 8 connecting the tip ends of the arc-shaped portions 4c of the plural flat tubes 4 is linear and parallel to the one side 3a of the fin 2; however, the heat exchanger 1 of Embodiment 2 includes a shape in which only the flat tubes 4 at both end portions on the one side 3a of the fin 2 are protruded from the opening ports 6.

Figure 5:
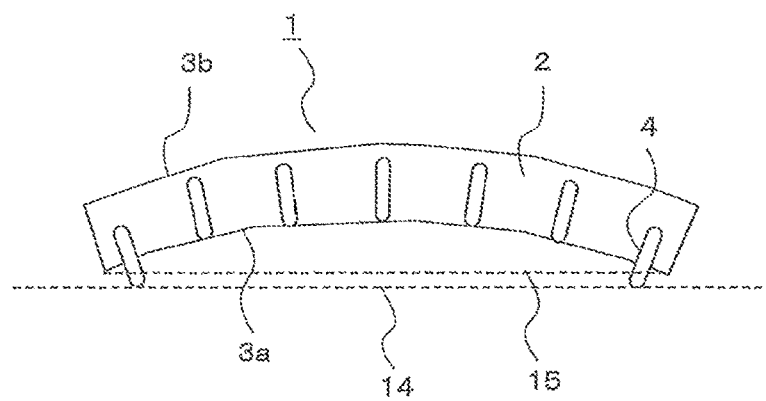
FIG. 5 is a cross-sectional view showing a heat exchanger in Embodiment 2.

FIG. 5 is a cross-sectional view showing the heat exchanger in Embodiment 2.

In the heat exchanger 1 of Embodiment 2, the shape of the fin 2 is assumed to have a bow in which the one side 3a becomes an inner side.

At this time, there is provided a configuration in which, of the flat tubes 4, the flat tubes 4 at the both end portions protrude outside the one side 3a of the fin 2 so that a tangential line 14 of the flat tubes 4 at the both end portions is positioned outside a subtense 15 connecting both ends of the one side 3a of the fin 2 with respect to the heat exchanger.

The heat exchanger of Embodiment 2 assumes a case in which the bow is generated in the fin 2. When the heat exchanger of the finned tube type depicted in FIG. 1 is manufactured, in general, the fins 2 and the flat tubes 4 are assembled first, and thereafter, brazing junction thereof is carried out. Depending on the manufacturing method, such as assembling operation or brazing of the fins 2 and the flat tubes 4, a bow is generated in the fin 2 in some cases.

There is provided the configuration of the heat exchanger for protecting the one side 3a of the fin 2 from an external force, in the same manner as Embodiment 1, even though the bow has a shape in which the one side 3a of the fin 2 becomes the inner side.

Figure 6A:
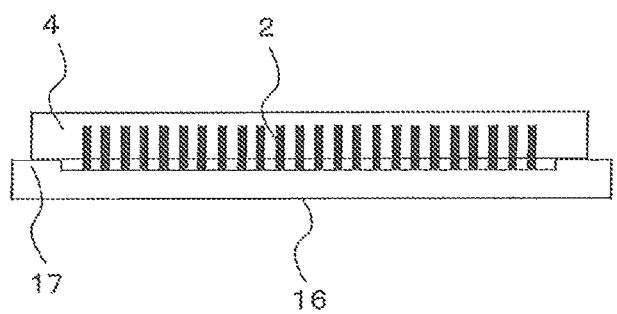
FIG. 6a is a diagram showing fins aligned on a flat tube insertion jig in a method of manufacturing a heat exchanger in Embodiment 2.
Figure 6B:
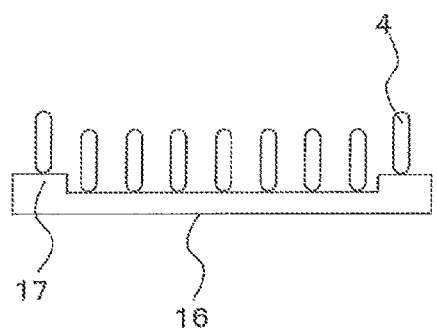
FIG. 6b is a diagram showing flat tubes aligned on the flat tube insertion jig in the method of manufacturing a heat exchanger in Embodiment 2.

A method of manufacturing such a heat exchanger will be described. FIG. 6a is a diagram showing the fins 2 aligned on a flat tube insertion jig 16 in the method of manufacturing a heat exchanger in Embodiment 2. FIG. 6b is a diagram showing the flat tubes 4 aligned on the flat tube insertion jig 16 in the method of manufacturing a heat exchanger in Embodiment 2.

First, as shown in FIG. 6a, the fins 2 are aligned on the flat tube insertion jig 16 in a flat-plate shape. Thereafter, as shown in FIG. 6b, the flat tubes 4 are inserted into the opening ports 6 of the fin 2. At this time, there are projections 17 at both end portions of the flat tube insertion jig 16, and the amount of insertion of the flat tubes 4 at the both ends into the opening ports 6 of the fin 2 becomes small as compared to other flat tubes 4; accordingly, the flat tubes 4 at the both ends are fastened in a shape having spatial portions, which become gaps, with the deepest portions 6a of the opening ports 6. With this state, the fins 2 and the flat tubes 4 are brazed. Note that, since the bow is generated in the heat exchanger after the fins 2 and the flat tubes 4 are assembled, the bow is not generated during the assembling operation.

In such a heat exchanger, even though the fin 2 of the heat exchanger 1 is bowed toward the one side 3a, the flat tubes 4 at both ends protrude from the one side 3a of the fin 2, to thereby receive an external force from the direction of the one side 3a, and therefore, it is possible to prevent deformation of the fin 2. Moreover, by configuring the air-conditioning apparatus by use of the heat exchanger 1 that is less likely to be deformed, there occurs no increase in air resistance or no degradation in heat exchanging efficiency of the heat exchanger part caused by the deformed fin 2, and thereby an air-conditioning apparatus with excellent cooling and heating performance becomes available.

Note that an example in which only the two flat tubes 4 at the both ends of the fin 2 protrude from the one side 3a of the fin 2 has been shown; however, even if other flat tubes 4 further protrude outward from the one side 3a, similar effects can be obtained. Moreover, depending on the protruding amount of the flat tubes 4, there may be a configuration in which, not necessarily the flat tubes 4 at both end portions, but some flat tubes 4 positioned inside thereof protrude.

Embodiment 3

In Embodiment 1, the flat tubes 4 are made to be uniformly protruded from the opening ports 6 of the fin 2, and the flat tube end portion tangential line 8 connecting the tip ends of the arc-shaped portions 4c of the plural flat tubes 4 is linear and parallel to the one side 3a of the fin 2; however, the heat exchanger 1 of Embodiment 3, includes a shape in which three flat tubes 4 at both end portions and a center portion on the one side 3a of the fin 2 are protruded from the opening ports 6.

Figure 7:
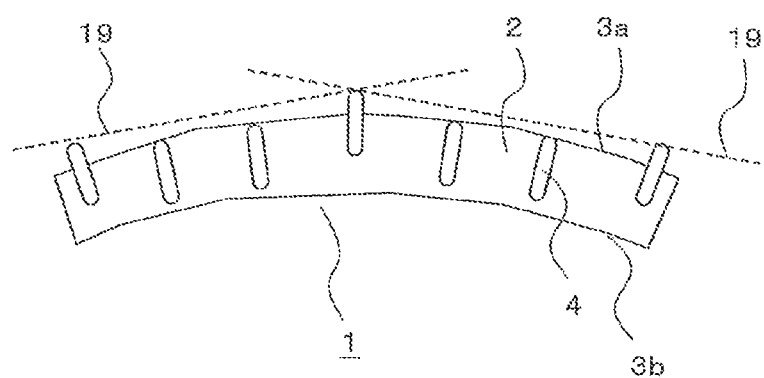
FIG. 7 is a cross-sectional view showing a heat exchanger in Embodiment 3.

FIG. 7 is a cross-sectional view showing the heat exchanger in Embodiment 3.

The heat exchanger 1 of Embodiment 3 assumes a shape of the fin 2 having a bow in which the one side 3a becomes an outer side.

At this time, there is provided a configuration in which, of the flat tubes 4, the flat tubes 4 at both end portions and a center portion protrude outside the one side 3a of the fin 2 so that a tangential line 19 of the flat tubes 4 at the both end portions and the center portion is positioned outside a curved line drawn by the one side 3a of the fin 2.

The heat exchanger of Embodiment 3 assumes, similar to Embodiment 2, a case in which the bow is generated in the fin 2. However, it is assumed that the bow is in the direction opposite to Embodiment 2.

There is provided a configuration of the heat exchanger for protecting the one side 3a of the fin 2 from an external force, in the same manner as Embodiment 1, even though the bow has a shape in which the one side 3a of the fin 2 becomes the outer side.

A method of manufacturing such a heat exchanger will be described. Similar to Embodiment 2, first, as shown in FIG. 6a, the fins 2 are aligned on the flat tube insertion jig 16 in a flat-plate shape. Thereafter, as shown in FIG. 6b, the flat tubes 4 are inserted into the opening ports 6 of the fin 2. At this time, by providing projections 17 at both end portions and a center portion of the flat tube insertion jig 16, the amount of insertion of the flat tubes 4 at the both end portions and the center portion into the opening ports 6 of the fin 2 becomes small as compared to other flat tubes 4; accordingly, the flat tubes 4 at the both end portions and the center portion are fastened in a shape having spatial portions, which become gaps, with the deepest portions 6a of the opening ports 6. With this state, the fins 2 and the flat tubes 4 are brazed.

In such a heat exchanger, even though the fin 2 of the heat exchanger 1 is bowed with the one side 3a being the outer side, the flat tubes 4 at the both ends and the center protrude from the one side 3a of the fin 2, to thereby receive an external force from the direction of the one side 3a, and therefore, it is possible to prevent deformation of the fin 2. Moreover, by configuring the air-conditioning apparatus by use of the heat exchanger 1 that is less likely to be deformed, there occurs no increase in air resistance or no degradation in heat exchanging efficiency of the heat exchanger part caused by the deformed fin 2, and thereby an air-conditioning apparatus with excellent cooling and heating performance becomes available.

Note that an example in which only the three flat tubes 4 at the both end portions and the center portion of the fin 2 protrude from the one side 3a of the fin 2 has been shown; however, further, even if other flat tubes 4 protrude outward from the one side 3a, similar effects can be obtained. Moreover, depending on the protruding amount of the flat tubes 4, there may be a configuration in which, not necessarily the flat tubes 4 at the both end portions and the center portion, but some other flat tubes 4 protrude.

Embodiment 4

In Embodiment 4, with respect to the shape of the fin 2 depicted in FIG. 3 related to Embodiment 1, recessed portions 6b are provided to the other side 3b. In other words, the embodiment is different in the shape of fin 2 from the heat exchanger 1 of Embodiments 1 to 3.

Figure 8:
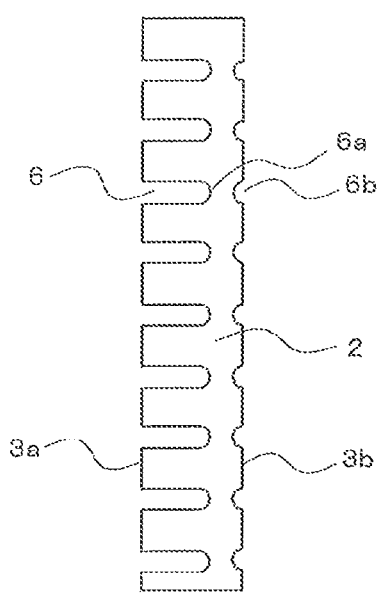
FIG. 8 is a plan view showing a fin of a heat exchanger in Embodiment 4.

FIG. 8 is a plan view showing a fin of a heat exchanger in Embodiment 4.

In FIG. 8, the opening ports 6 and the recessed portions 6b are provided on the one side 3a and the other side 3b, respectively, at the same positions opposing in a lengthwise direction on the page. Moreover, the width of the recessed portion 6b in the lengthwise direction on the page and the width of the opening port 6 in the lengthwise direction on the page are formed equally.

Next, a manufacturing method for manufacturing the heat exchanger 1 of Embodiment 4 will be described.

The fin 2 of the heat exchanger 1 is manufactured by processing a hoop material 30, which is the sheet-like fin material wound around a reel.

Figure 9:
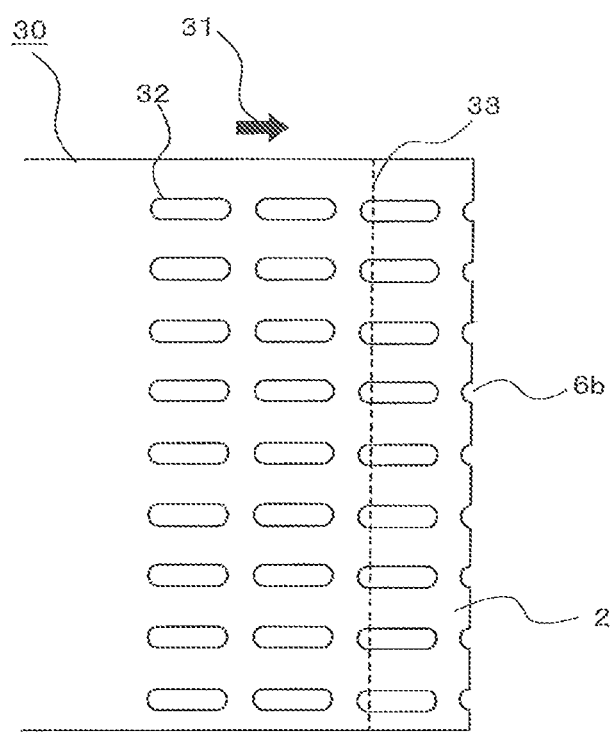
FIG. 9 is a plan view of a hoop material, which is a material of the fin in Embodiment 4.

FIG. 9 is a plan view of the hoop material, which is the fin material in Embodiment 4.

In FIG. 9, a direction of the hoop material 30 passing through a press device is indicated by a hoop material forwarding direction 31.

In Embodiment 4, first, long holes 32 are formed in the hoop material 30, and various kinds of projections or cutouts for improving performance of the fin 2 are formed by use of a press device including metal molds. Next, the hoop material 30 is cut to a predetermined width at a fin cut-off line 33, which is a position passing the long holes 32, to form the fin 2.

Here, positions of the fin cut-off line 33 with respect to the positions of the long holes 32 can be easily changed by adjusting the press device including the metal molds. Accordingly, it is also possible to easily change the depth of the opening port 6 and the recessed portion 6b of the fin 2 molded by use of such a hoop material 30.

With regard to the method of assembling the fins 2 and the flat tubes 4, any of the method shown in Embodiment 1, in which the fins 2 are held one by one by the fin holding units 12 of the fin insertion device 9 and moved, to be inserted into the flat tubes 4 arranged on the flat tube positioning member 10 and fastened, and the method, as shown in Embodiment 2 or 3, in which the fins 2 are positioned and aligned by a jig or the like in advance, and the flat tubes 4 are inserted into the opening ports 6 of the aligned fins 2 and assembled, may be employed. Then, the fins 2 and the flat tubes 4 are finally joined by brazing or the like.

For making the effect of preventing deformation of the fin 2 remarkable, it is effective to allow the flat tubes 4 to have large protruding dimension; however, if the insertion depth of the flat tube 4 into the opening port 6 becomes extremely shallow, the heat transfer performance of the flat tube 4 and the fin 2 is degraded.

In the method of manufacturing the heat exchanger 1 of Embodiment 4, it becomes possible to conveniently carry out fine adjustment of the protruding dimension of the flat tube 4 by adjusting the position of the fin cut-off line 33 with respect to the positions of the long holes 32.

Accordingly, it becomes possible to arrange the flat tubes 4 at most effective positions with respect to conflicting function effects of the prevention effect for deformation of the fin 2 and the heat transfer performance.

REFERENCE SIGNS LIST

1 heat exchanger 2 fin 3a one side 3b the other side
4 flat tube 4a arc-shaped portion 4b long side portion 4c arc-shaped portion 6 opening port 6a deepest portion 6b recessed portion
8 flat tube end portion tangential line 9 fin insertion device 10 flat tube positioning member 11 fin contact member 12 fin holding unit 14 tangential line 15 subtense 16 flat tube insertion jig 17 projection
19 tangential line 20 drum 30 hoop material 31 hoop material forwarding direction 32 long hole 33 fin cut-off line

The invention claimed is:

1. A heat exchanger including plural heat transfer tubes and plural fins, wherein
   each fin has a first edge and a second edge, which are opposed, and plural opening ports on the first edge, for inserting and fastening the plural heat transfer tubes,
   the heat exchanger is formed such that the plural heat transfer tubes and the plural fins cross each other,
   only two of the plural heat transfer tubes are fastened to the opening ports in a state such that an outer side of each of the two heat transfer tubes protrudes from the first edges of the fins, and the two heat transfer tubes are located at opposite end portions of the fins,
   each of innermost ends of the opening ports is spaced apart from the second edge of the fins, respectively,
   the heat transfer tubes have a width dimension that is measured along a line that extends from the first edge to the second edge of each fin, and
   the width dimension of the heat transfer tubes is uniform.

2. The heat exchanger of claim 1, wherein the heat transfer tubes are flat tubes.

3. The heat exchanger of claim 1, wherein the heat exchanger forms part of an air-conditioning apparatus.

\* \* \* \* \*